Jan. 27, 1925.
C. H. LOOP
VALVE
Filed Dec. 4, 1923
1,524,267
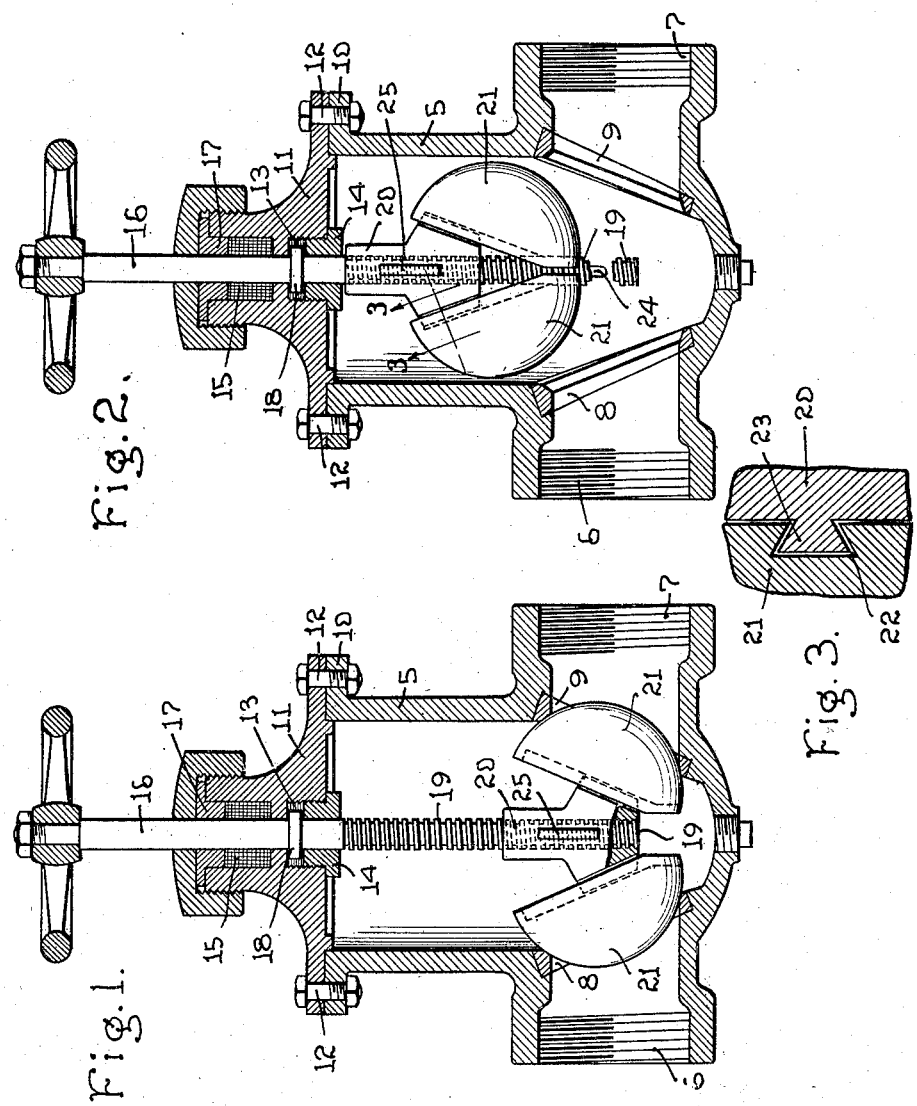

Patented Jan. 27, 1925.

1,524,267

UNITED STATES PATENT OFFICE.

CHARLES H. LOOP, OF ARKANSAS CITY, KANSAS.

VALVE.

Application filed December 4, 1923. Serial No. 678,471.

*To all whom it may concern:*

Be it known that I, CHARLES H. LOOP, a citizen of the United States of America, and resident of Arkansas City, in the county of Cowley and State of Kansas, have invented certain new and useful Improvements in Valves, of which the following is a specification.

This invention relates to gate valves and has for an object the production of a valve with semi-spherical controls for the straightway inlet and outlet passages of the valve casing; the said controls being simultaneously operated by a non-rising screw-threaded stem and the controls being of a nature which will permit unobstructed passage through the valve casing when the valves are moved out of line with the inlet and outlet passages of the casing.

It is a further object of this invention to produce a valve casing having branches or coupling nipples for the passage of fluid, each of the nipples or passages being provided with an inclined valve seat and having semi-spherical valves coacting therewith, including means for operating the valves and maintaining them in effective relation to the valve seats.

It is a further object of this invention to produce a valve of the character indicated, the valves of which are interchangeable so that there is no likelihood of their being assembled incorrectly; and a further object of the invention is that the relation of the wedge and semi-spherical members is such that the valve can be inverted or installed in a diagonal position without interfering with its operation, since the action of the valve operating mechanism is positive in both directions.

It is a further object of this invention to produce controls or substantially semi-spherical or hemispherical valve elements proper of the character indicated removably assembled in operative relation to a wedge member of the valve stem and interchangeable with respect thereto, to insure that the parts may be replaced or renewed, should they become worn or impaired.

A further object of my invention is to provide a valve casing with diverging valve seats for alined ways, a valve chamber, a non-rising screw threaded stem, a wedge member carried by the stem, and substantially semi-spherical controls or valve members which slidably engage with the wedge member, the respective valve seats, the plane faces of the valve members or controls, and the inclined faces of the wedge member being parallel when assembled, and when in use the convex surfaces of the controls will be self-seating, and when seated will be forced laterally against the seats, thus providing an efficient closure of the ways which will also tend to press the valve seats against the recesses in which they are seated.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a vertical sectional view of the valve showing the parts in position to close the passage through the valve;

Figure 2 illustrates a similar view with the valve open; and

Figure 3 illustrates an enlarged detail sectional view on the line 3—3 of Fig. 2.

In these drawings 5 denotes a valve casing having branches or passages 6 and 7, through which fluid may flow, the said valve casing having diagonally disposed valve seats 8 and 9 at the junction of the valve casing and the branches or passages. The valve seats may be made of some suitable relatively soft metal and they can be secured in place in any appropriate manner, as by friction, threads or the like, and the inventor does not wish to be limited with respect to this detail.

The valve casing has an open upper end and an outwardly extending flange 10 on which a bonnet 11 may be secured by fastenings 12 such as bolts or the like. The bonnet has a recess 13 in its lower surface, the wall of which is threaded to engage the threads of an apertured plug 14 that is stationary during the operation of the valve, as will presently appear. The bonnet has and apertured packing gland 15 through which a valve stem 16 extends, and a packing box 17 with a conventional provision for imparting pressure on the packing to insure a tight joint around the valve stem.

A flange 18 is formed on the valve stem and it is located between the inner end of the plug 14 and the packing gland in order that axial movement of the valve stem may be prevented. The valve stem is threaded, as shown at 19, for a considerable portion of its length, and these threads are engaged by threads of a wedge 20 which, during the rotation of the valve stem, causes the wedge to move longitudinally of the valve stem, according to the direction of rotation of the said valve stem.

A double wedge acts in conjunction with the semi-spherical valves 21 which are of a size to fit against the valve seats and they are pressed into engagement by the valve seats by the action of the wedge. The plane faces of the valves are provided with dovetail grooves 22 which receive ribs 23 that are shaped complemental to the shape of the grooves so that the ribs slide in the grooves during the manipulation of the wedge for the purpose of seating or unseating the valve elements.

The inner surface of the valve casing is slotted as shown at 24, and the slot or slots receive a projection or projections such as 25 in the nature of a feather, projecting from the wedge in order that rotation of the wedge will be prevented, and in order that the valves may be maintained in operative relation to their seats. Under certain conditions of use, one feather would be sufficient, but the inventor prefers two such feathers extending from opposite sides of the wedge into appropriate grooves in the sides of the casing.

The valve casing may be of the usual construction, as well as the non-rising valve stem, which in the present instance has associated therewith two semi-spherical valve members 21, the plane faces thereof being cut away at an angle to the major portion of the flat faces thereof, and the recesses 22 may be continued to the margins of the convex portions of the valve to provide centrally located recesses or clearance spaces for the threaded portion of the stem, as shown. The dovetail recesses in the plane surfaces of the partly spherical members do not extend to the perimeter, but stop short theref to provide stops against which the shoulders of the wedge will abut when the valve stem is turned in a direction to unseat the valve members.

In operation, when the valve stem is turned in one direction, as to close the ways of the valve casing, the wedge will be lowered, the valve members will then be unsupported moving to seating position, and in such position, the wedge will force the spherical portions of the valves 21 against their seats, the combined force of the screw and the inclines of the wedge acting to press each valve laterally, the pressure being mainly in line with the centers of the alined ways of the casing. To unseat the valve, the valve stem is moved in proper direction, the wedge being moved into the chamber when its shoulders will engage the projections at the ends of the dovetail recesses, and by engagement therewith, carry the valve members into the chamber, where they will be maintained.

The relation of parts is well shown in Figs. 1 and 2 when the valves are closed and opened respectively, and the construction and operation of the device will, it is thought, be understood by one skilled in the art, from the foregoing disclosure.

I claim:

1. A gate valve comprising a casing having alined ways and a valve receiving chamber, inclined valve seats for each of the ways, a non-rising screw threaded stem carried by the casing, a non-rotatable wedge mounted on the stem, a pair of substantially hemispherical valve seat engaging members, each member having opposite its convex surface a plane surface, and means for connecting the hemispherical valves in slidable engagement with the wedge.

2. In a double valve, a valve casing having passages, valve seats in spaced relation to each other in the casing and being set therein to flare upwardly, substantially semi-spherical valves, a wedge having branches with dovetail connections with the said valves, means for reciprocating the wedge in a direction at right angles to the axes of the passages through the valve casing and means for preventing rotation of the wedge.

3. In a double valve, a valve casing having passages, valve seats in proximity to the junction of the valve casing and passages, the said valve seats diverging with respect to the axes of the passages, substantially semi-spherical valves adapted to engage the valve seats, a wedge having sliding engagement and connection with the plane surfaces of the valves, means for preventing rotation of the wedge, and means for reciprocating the wedge.

4. In a double valve, a valve casing having passages, valve seats in proximity to the junction of the valve casing and passages, the said valve seats being diagonal with respect to the axes of the passages, substantially semi-spherical valves adapted to engage the valve seats, a wedge having sliding engagement and connection with the plane surfaces of the valves, the said valve casing having slots in its wall, and feathers on the wedge entering the slots to prevent rotation of the wedge.

5. In a gate valve, a casing, a stem held in rotatable and non-rising engagement with the casing, a wedge mounted on the stem, valves having substantially semi-spherical valve seat engaging portions, means for slidably connecting the valves with opposite sides of the wedge, valve seats which diverge, the valve having plane faces with recesses and stops, said faces being parallel with the faces of the valve seats and also parallel with inclined valve engaging faces of the wedge, the valves being adapted to be first seated and then forcibly pressed simultaneously against their respective seats.

6. A gate valve casing having ways and a valve chamber, diverging valve seats for the ways, a non-rising rotatable stem associated with the valve casing, a non-rotatable wedge having opposite faces which parallel their respective valve seats, semi-spherical valves having recesses in their plane surfaces which terminates short of one of the edges of the inner faces of the valves to provide shoulders with which the wedge will engage in lifting the valves off their seats, the parts being organized so that the valves will seat themselves and may be then pressed forcibly against the valve seats.

7. A gate valve comprising a casing having a chamber and in communication therewith alined ways, valve seats for the ways, a rotatable and non-rising screw associated with the casing, a wedge carried by the screw and means for holding the wedge against rotation, a pair of substantially semi-spherical valves maintained in slidable engagement with the wedge which separates the valves when moved toward the ways having the valve seats, the parts being organized so that the valve seats, the plane surfaces of the semi-spherical valves, and the sides of the wedge will be substantially parallel.

CHARLES H. LOOP.